INVENTOR.
THOMAS L. LOPOSER

BY Moody and Antrim
AGENTS

INVENTOR.
THOMAS L. LOPOSER
BY Moody and Antrim
AGENTS

Sept. 25, 1962 T. L. LOPOSER 3,056,109

AUTOMATIC MORSE CODE RECOGNITION SYSTEM

Filed Sept. 15, 1960 4 Sheets-Sheet 3

INVENTOR.
THOMAS L. LOPOSER
BY Moody and Antrim
AGENTS

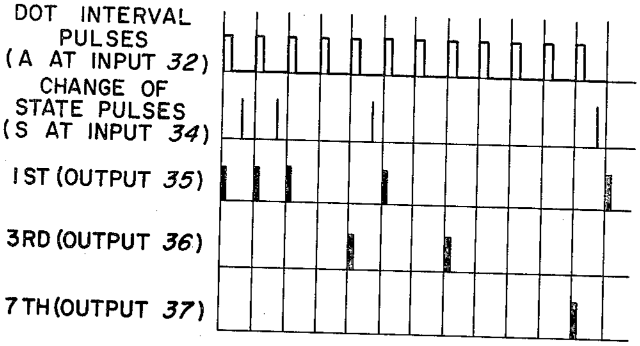
FIG 4
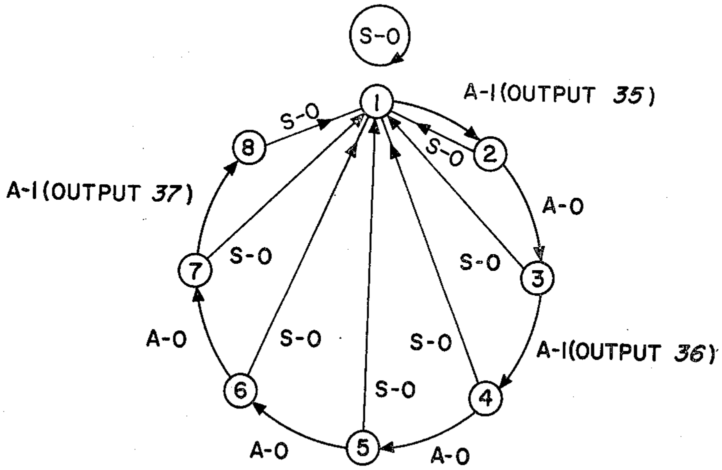
FIG 5
INTERVAL GENERATOR LOGIC DIAGRAM
FIG 6
| STATE | FLIP FLOPS 68 | 69 | 70 |
|---|---|---|---|
| 1 | 0 | 0 | 0 |
| 2 | 0 | 0 | 1 |
| 3 | 0 | 1 | 0 |
| 4 | 0 | 1 | 1 |
| 5 | 1 | 1 | 1 |
| 6 | 1 | 1 | 0 |
| 7 | 1 | 0 | 1 |
| 8 | 1 | 0 | 0 |
INVENTOR.
THOMAS L. LOPOSER
BY Moody and Antrim
AGENTS

United States Patent Office 3,056,109

Patented Sept. 25, 1962

3,056,109

AUTOMATIC MORSE CODE RECOGNITION SYSTEM

Thomas L. Loposer, Dallas, Tex., assignor to Collins Radio Company, Cedar Rapids, Iowa, a corporation of Iowa Filed Sept. 15, 1960, Ser. No. 56,158
6 Claims. (Cl. 340—164)

This invention pertains to pulse decoders and particularly to systems for selecting those signals which have pulses with predetermined relative spacings.

The code recognition system according to this invention may be connected to a radio receiver which has facilities for automatically tuning throughout a band of frequencies. When the system responds to a desired type of signal, the tuning operation of the receiver may be delayed as long as desired to permit a recorder that is coupled to the receiver to record the message. The embodiment described herein provides a command signal to start a recorder in response to the reception of Morse code only.

An object of this invention is to derive a control signal indicative of the reception of a predetermined type of code signal.

A feature of this invention provides sampling of unknown signals for a predetermined period and for counting changes of state during this period in order to determine a standard interval of signal spacing.

Another feature provides generation of various pulse intervals as multiples of the standard interval.

And still another feature is the provision for rejecting a signal which has in addition to pulses at the desired intervals, pulses at other intervals.

The following description in the appended claims may be more readily understood with reference to the accompanying drawings, in which:

FIGURE 4 is a diagram to show the outputs of the interval generator of FIGURE 3 in response to certain pulse inputs;

FIGURE 5 is a logic diagram to show the sequence of operation of the interval generator which is shown in FIGURE 3; and FIGURE 6 is a chart to show the states of operation of the flip-flop multivibrator circuits of FIGURE 3 for different sequences of pulse inputs.

Briefly, the embodiment of the invention described herein attempts to analyze any received signal as if it were Morse code. Statistically, a message in Morse code has one-half as many signal changes as the greatest possible number of changes which could be obtained by constantly repeating the signal character which has the shortest interval. In this description the shortest interval which corresponds to a dot in Morse code is termed a dot-interval. Therefore, the duration of each dash is three dot-intervals; the space between a dot and an adjacent dash within a letter is one dot-interval; the space between adjacent letters is three dot-intervals; and the space between adjacent words is seven dot-intervals. Obviously, Morse code is characterized by one, three, and seven dot-intervals.

In the present example, 64 changes of state of the incoming signal are counted, timed, and then the timed interval is divided by 128 to determine a reference dot-interval. The reference dot-interval is re-created repeatedly by spaced pulses and synchronized with the incoming signal to supply pulses at first, third, and seventh dot-intervals.

Pulses created by changes of state of the incoming signal and pulses for the first, third, and seventh intervals are applied to the inputs of two channels for testing coincidence of signal pulses at the first, third, and seventh intervals. One of the channels develops a control voltage or an accept-signal command in response to coincidence at the tested intervals. In the other channel, a signal is tested for signal pulses which occur at intervals other than the first, third, and seventh intervals. The presence of a significant number of pulses at the other intervals blocks the application to the output control circuit of the accept-signal command which is developed by the one channel for coincidence at the first, third, and seventh intervals. That is, the lack of a significant number of pulses at the first, third, and seventh intervals or the presence of a significant number of pulses at other intervals provides a reject signal.

Figure 1:
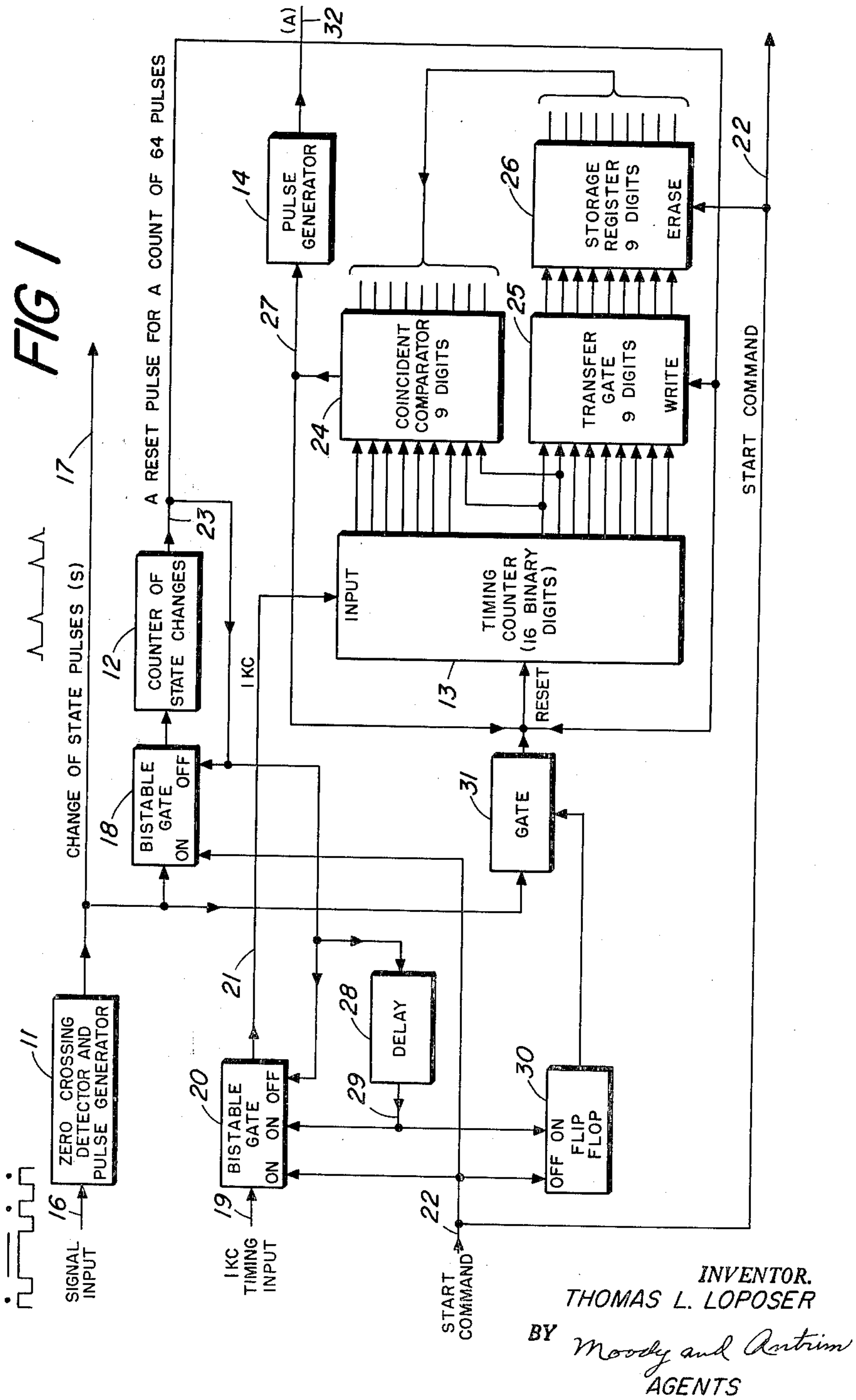
FIGURES 1 and 2 are a block diagram of the Morse signal recognition system of this invention.
Figure 2:
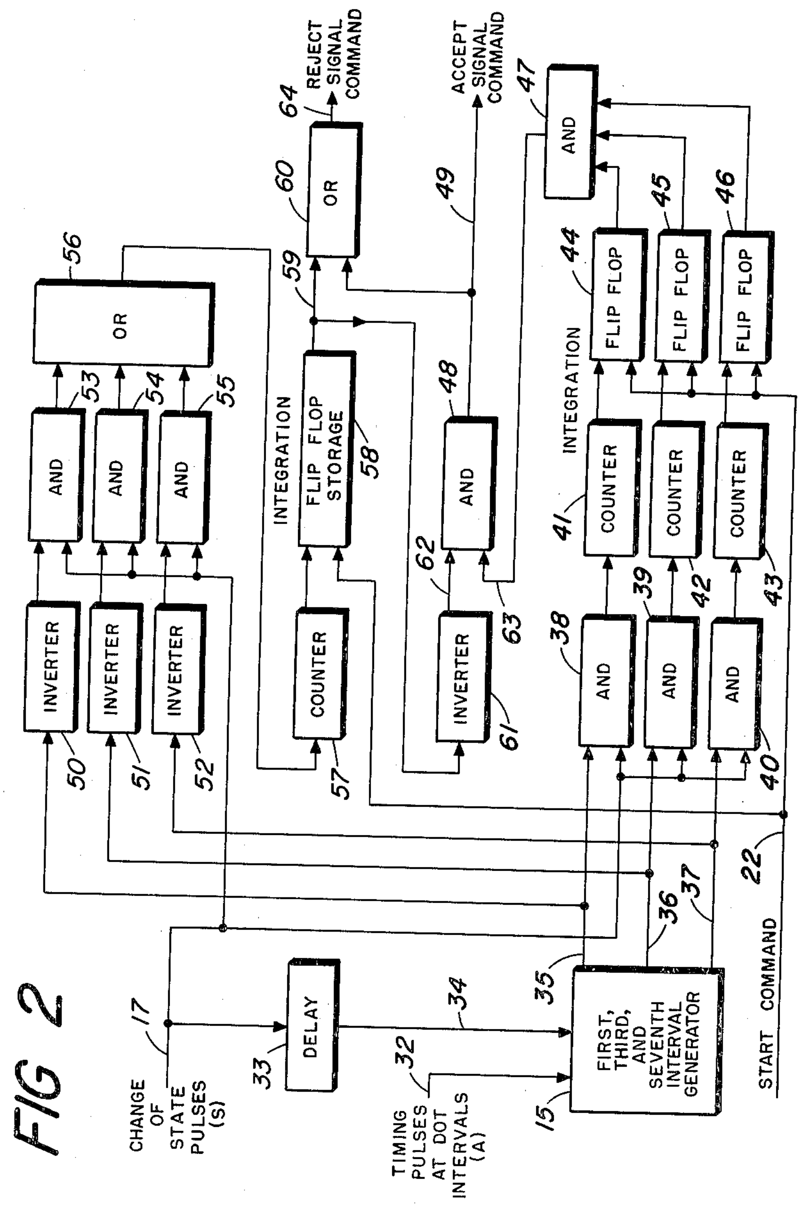

Namely, the system that is shown in FIGURES 1 and 2 comprises a zero-crossing detector 11 for providing pulses corresponding to changes of state of an incoming signal, a first counter 12 for counting the changes of state, a second counter 13 which cooperates with its associated storage and comparator circuits and also with pulse generator 14 for developing dot-interval pulses as if the incoming signal were a Morse code signal, an interval generator 15 for generating pulses at first, third, and seventh dot-intervals, and finally, gating and integrative circuits responding to the application of pulses from the interval generator and from the zero-crossing detector for differentiation between Morse code and any other signal.

In detail, the output of a receiver for supplying signals that are to be tested is connected to input 16 of the zero-crossing detector and pulse generator 11. Any received signal is limited or clipped, differentiated, and rectified to supply a series of pulses to output conductor 17. Each impulse corresponds to a change of state providing a change of state is defined as being a change in only one direction of sufficient amplitude to cause the instantaneous signal voltage to cross the mean signal voltage. The change-of-state pulses are applied through conductor 17 to the input of timing circuits for counting time, to circuits for resetting both gates and timing circuits, and to the gating and integrative circuits for determining coincidence of the pulses at predetermined dot-intervals. At the beginning of the period for testing a newly received signal, the signal is first effective when it is applied through bistable gate 18 to the input of counter 12.

A source of 1-kilocycle timing signal is applied through conductor 19 to the input of bistable gate 20. Bistable gate 20 is normally closed until a start-command signal is applied to its input for opening the gate so that the 1-kilocycle timing signal is applied through conductor 21 to the input of counter 13.

A circuit for applying a single start-command impulse at the initiation of a test period is connected through conductor 22 to an ON circuit of bistable gates 18 and 20, to the OFF circuit of flip-flop 30 for closing gate 31, as well as to other bistable circuits, which, as will be described below, must be set to predetermined states at the beginning of a test period. The application of start-command signal opens both gates 18 and 20 for simultaneously applying change-of-state pulses to the input of counter 12 and 1-kilocycle timing signal to the input of counter 13.

Counter 12 is a binary counter which upon completion of a count of 64 applies a pulse to its output conductor 23. The counter may be the usual type having a series of bistable elements. Until this pulse is developed, the other counter 13 in response to the application of 1-kilocycle signal to its input is counting the number of milliseconds required for 64 changes of state of the input signal. The counter 13 is also a binary type having a series of bistable elements. The elements one to nine inclusive which are operated earliest in the series are connected to a nine-digit coincidence comparator and elements eight to sixteen inclusive are connected to a nine-digit transfer gate 25.

The transfer gate 25 has individual gating elements for each of its nine input conductors. The outputs of these elements are connected through respective conductors to a nine-digit storage register 26. Normally, the gating elements of gate 25 are closed, but they are opened momentarily by the application of a pulse to its write-circuit. The application of the pulse which is developed by counter 12 transfers the nine most significant digits recorded by counter 13 to storage register 26. The nine elements of the register 26 are connected through respective conductors to corresponding terminals of coincident comparator 24. Comparator 24 develops a pulse for application to conductor 27 in response to the count on timing counter 13 becoming equal to the stored digits on register 26.

When all the elements of counter 12 have been operated to indicate 64 changes of state of the incoming signal, the pulse which is applied to conductor 23 operates bistable gates 18 and 20 to their closed positions for removing the respective input signals from counters 12 and 13. Since gate 25 transfers only the nine most significant binary digits and drops the seven least significant digits, the binary number stored on register 26 is equal to the number recorded on counter 13 divided by 128. Since it can be shown statistically that 128 is within about 1½ percent of the number of dot-intervals in Morse code during the reception of a signal having 64 changes of state, the digits stored on register 26 correspond in milliseconds to one dot-interval of the incoming signal providing it is a Morse code signal.

The same pulse from counter 12 which transfers the binary digit which corresponds to a dot-interval to the storage register 26, also resets the timing counter 13. The delay circuit 28 is connected between the output 23 of counter 12 and the control circuit 29 for closing gate 20 and for operating flip-flop 30 to close gate 31. Therefore, shortly after the timing counter 13 has been reset, bistable gate 20 is reclosed for applying the 1-kilocycle timing signal to the input of the counter. Gate 31 is connected between the output of zero-crossing detector and pulse generator 11 and the reset terminal of counter 13 in order to synchronize dot-interval timing with the incoming signal. After a pulse which indicates a change of state of incoming signal has been applied through gate 31 for resetting counter 13, the counter in cooperation with comparator 24 operates to produce a series of equally spaced intervals equivalent to the previously measured dot-intervals until a subsequent pulse corresponding to a change of state is applied to gate 31 for again resetting counter 13. Obviously, if the signal being received is Morse code that has originated in an automatic sender, the reset pulses coincide with the dot-intervals so that a substantially uninterrupted series of pulses spaced according to the dot-interval is applied from coincident comparator 24 to conductor 27. Conductor 27 is connected to the reset terminal of counter 13 for automatically resetting the counter at the termination of each dot-interval and is also connected to the input of pulse generator 14.

Pulse generator 14 provides a pulse for each dot-interval. Adjustment of the pulse width determines what variation is permissible in an incoming signal with reference to the dot-interval and still have the signal be tested as coincident. The reference pulses are applied through output conductor 32 to one of the two inputs of the first, third, and seventh interval generator 15. Conductor 17 on which change-of-state pulses are applied, is connected through delay circuit 33 to conductor 34 which is connected to the other input of the interval generator. The delay circuit merely delays the change-of-state pulse slightly in order to insure that the timing pulses at dot-intervals are first applied to the interval generator. The timing pulses operate the generator through successive states. A delayed signal pulse resets the generator to its initial state so that it starts a new series by providing a first output pulse in response to the next succeeding input dot-interval pulse.

The interval generator has eight states of operation, as described below, for providing first, third, and seventh dot-interval pulses to its output conductors 35, 36, and 37, respectively. The pulses at these intervals are applied to the respective conductors repeatedly providing the change-of-state pulses from zero-crossing detector 11 do not occur to reset counter 13 before the end of one of the intervals.

The conductors 35–37 to which the dot-intervals are applied are connected to the respective input terminals of the AND gates 38–40 and to the input terminals of voltage inverters 50–52. The channel which contains the AND gates 38–40 tests for the presence of signal during the first, third, and seventh dot-intervals, while the channel which contains inverters 50–52 tests for presence of signal during intervals other than the first, third, and seventh dot-intervals. The change-of-state pulses on conductor 17 are applied to the second terminals of AND gates 38–40. When change-of-state pulse and a dot-interval pulse for the respective AND gate are coincident, the output of the particular one of the AND gates 38–40 is connected to the input of a respective counter 41–43.

The counters 41–43 may be the usual binary type having bistable elements. These counters serve as integrating elements and might be replaced by resistor-capacitor networks so that the succeeding bistable circuits or flip-flops 44–46 do not change state until a certain charge is accumulated. The outputs of the counters are applied to the inputs of the bistable flip-flop circuits 44–46. Each of the counters 41–43 operate in response to change-of-state pulses and dot-interval pulses being applied simultaneously to the respective AND circuits 38–40. After a predetermined number of coincidences has been obtained as determined by the number of impulses required to complete the operation of the respective one of counters 41–43, the corresponding flip-flops 44–46 operate. The outputs of the flip-flops are connected to the input terminals of AND gate 47. When the three flip-flops 44–46 have been operated, voltage for operating AND gate 48 is applied through gate 47 to conductor 63 which connects the output of AND gate 47 to the input of AND gate 48. This voltage corresponds to that required for applying an accept-signal-command voltage to output conductor 49, but is prevented from being applied through AND gate 48 to output conductor 49 when the test channel which contains inverters 50–52 indicates that there has been a substantial number of signal impulses at times other than the first, third, and seventh dot-intervals.

Each of the inverters 50–52 and conductor 17 for applying change-of-state pulses are connected to the respective inputs of corresponding AND gates 53–55. The outputs of the AND gates are connected through an OR gate 56 for applying a signal to a succeeding counter 57 whenever a signal pulse occurs other than at the first, third, and seventh dot-intervals. After sufficient number of random pulses have been received to operate counter 57 a predetermined number of times, the flip-flop circuit 58 operates for applying a control voltage to conductor 59. The output 59 of the flip-flop is connected to an OR gate 60 for applying a signal voltage to conductor 64 which is connected to a control circuit to reject the signal because it is either a signal other than a Morse code signal or is a Morse code signal that contains considerable interference.

Conductor 59 to which a voltage is applied for indicating reception of random signal is also connected to the input of inverter 61 which has its output connected to the input of AND gate 48. When this voltage that indicates the presence of random signal is applied to AND gate 48, the gate is maintained closed to prevent application of that voltage to conductor 49 which indicates signal of proper coincidence is present. Therefore, it is obvious that before a voltage can be applied to conductor 49 for indicating that a signal is Morse code, the signal must be tested for coincidence at first, third, and seventh dot-intervals and also be tested for absence of signal at other intervals.

The control conductor 49 for indicating acceptance of the signal is also connected to an input of OR gate 60. Before acceptance has been indicated, the voltage on conductor 49 is of proper polarity for applying voltage through the OR gate 60 to control conductor 64 for indicating that the signal is still rejected. It is therefore obvious that a signal is rejected until there is a definite indication of acceptance and still is rejected when sufficient random impulses are present.

Figure 3:
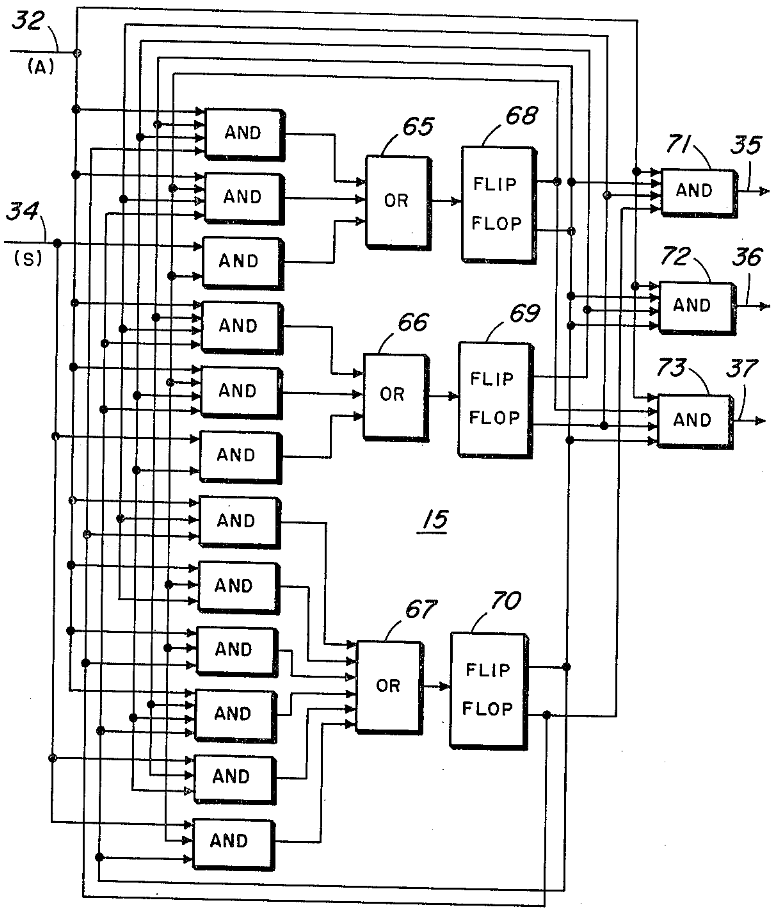
FIGURE 3 is a detailed block diagram of the interval generator that is shown in FIGURE 2.

A detailed block diagram of interval generator 15 is shown in FIGURE 3. The generator has three groups of input AND gates connected through respective OR gates 65–67 for controlling inputs of flip-flops 68–70, respectively. The inputs of the three groups of AND gates are connected to conductor 32 to which is applied dot-interval pulses, to conductor 34 to which is applied signal change-of-state pulses, and also to the outputs of flip-flops 68–70. The outputs of the flip-flops are also connected to certain inputs of output AND gates 71–73. The conductor 32 for supplying pulses spaced according to dot-intervals is also connected to an input of each one of the AND gates 71–73.

Pulses are applied to the input AND gates for obtaining the sequence of operation as shown in FIGURE 5 with reference to the states of the flip-flops 68–70 shown in FIGURE 6. Briefly, this sequence of operation prepares the output AND gates 71–73 at required intervals to conduct pulses from pulse generator 14 to conductors 35, 36, and 37, respectively, at first, third, and seventh intervals after any change of state of a received signal.

The successively numbered positions for changes of state as shown in FIGURE 5 correspond to the states tabulated in FIGURE 6. A continuous series of pulses spaced in time at dot-intervals are applied to input conductor 32 as represented by the top line of FIGURE 4. The pulses of adjusted width are constantly repeated and the spacing is continuous in response to the reception of Morse code which is transmitted correctly at a uniform rate. Other types of signal with random spacing cause the pulses to shift along the time base as required for synchronism according to the previously described operation of that synchronizing circuit which includes gate 31 of FIGURE 1.

The application of dot-interval pulses A to input 32, without the application of change-of-state pulses S to conductor 34, operates the interval generator continuously through its successive states shown on FIGURE 5. The AND gate 71 is momentarily opened after the first pulse and the AND gates 72 and 73 are opened momentarily after the third and seventh pulses, respectively. While the gates are open, a pulse of voltage from conductor 32 is applied to conductors 35, 36, and 37, respectively, to define the first, third, and seventh dot-intervals. Regardless of the state of operation of the interval generator 15 in response to the previous application of dot-interval pulses, the application of a change-of-state pulse S causes the interval generator to return to state one such that the flip-flops 68–70 are in their zero states according to FIGURE 6. The change-of-state pulses as represented in line 2 of FIGURE 4 have been delayed by delay circuit 33 to insure that the interval generator has been fully operated to a successive state before being returned to its number one state by the application of the change-of-state pulse. With reference to FIGURE 4, it is observed that a first interval pulse is generated in response to the application of a dot-interval pulse after each change-of-state pulse, and that the third and seventh interval pulses are generated simultaneously with the third and seventh dot-interval pulses which occur before the generator is reset by a change-of-state pulse.

Immediately in response to the application of a reject-signal command on conductor 64, or later at the end of a recording period in response to a timed pulse which is developed in a timing circuit responsive to an accept-signal command being applied to conductor 49, a receiver for supplying the incoming signal may be tuned to an adjacent channel in which signal is present. After the tuning cycle is completed, a start-command signal is applied to conductor 22 and the identification testing cycle described above is commenced. Conductor 22, to which the start-command signal is applied, in addition to being connected to resetting circuits for gates 18, 20, and 31 as previously described, is connected to storage register 26 for erasing the stored information and is also connected to resetting circuits of flip-flops 58 and 44–46 which are in the circuits for testing coincidence of signal at dot-intervals.

Although this invention has been described with respect to a single embodiment, it is to be understood that a technician skilled in the art can make obvious changes for adapting the identification systems to various applications and still be within the spirit and scope of the invention as stated in the following claims.

What is claimed is:

1. A system for recognizing coded electrical signals comprising, a first input terminal, means responsive to the application of signal to said first input terminal for developing change-of-state pulses, a second input terminal, means for developing a reset signal in response to the application of a start command signal to said second input terminal and in response thereafter to the application of a predetermined number of said change-of-state pulses, means responsive to the application of said start command signal and of the successive application of said reset signal for storing electrical information indicative of the total interval required for counting said predetermined number of pulses, for transferring said electrical information indicative of said total interval into electrical information for a reference timing interval that is a predetermined fraction of said total interval, and for developing reference pulses separated by said reference timing interval as determined by said stored electrical information, each reference timing interval being a predetermined fraction of said total interval, means responsive to the application of said pulses which are separated by said reference timing intervals for developing simultaneously different series of repetitive interval pulses, the pulses in said different series being separated by different predetermined numbers of said reference timing intervals, means for determining coincidence of said change-of-state pulses with the pulses of said series, and means for developing a control signal in response to a predetermined number of coincidences between said change-of-state signal and each of said differently separated interval pulses in said series.

2. A system for recognizing coded electrical signals comprising, an input to which is applied signal that is to be tested, means responsive to the application of said signal for generating change-of-state pulses, means operative in response to the application of said change-of-state pulses to measure an interval required for the application of a predetermined number of said change-of-state pulses and for establishing electrical information corresponding to said interval, means responsive to the application of said electrical information for computing and storing additional electrical information indicative of a reference interval that is a predetermined fraction of the total interval required for application of said predetermined number of change-of-state pulses, means responsive to the application of said additional stored information and to application of said change-of-state pulses for generating a continuous series of timing pulses in which the pulses are separated by said reference interval, means responsive to the application of said change-of-state pulses for synchronizing said change-of-state pulses and said timing pulses, gating means having a plurality of output circuits, said gating means responsive to the application of said change-of-state pulses and of said reference interval pulses for generating different repetitive series of pulses, the pulses in each of said series being separated by different predetermined numbers of said reference intervals and corresponding pulses of said series starting with the application of each of said change-of-state pulses being applied to respective ones of said output circuits, and coincidence means for determining coincidences of said change-of-state pulses and said corresponding pulses of said series.

3. In a code recognition system accorded to claim 2 in which said coincidence means has first and second channels, each of said channels having a test gate connected to each of said output circuits of said gating means, means for applying change-of-state pulses to each of said test gates, each of the test gates of said first channel being opened in response to the application of a pulse from the respective one of said output circuits and the simultaneous application of one of said change-of-state pulses, each of said test gates in said second channel remaining closed in response to the simultaneous application of one of said change-of-state pulses and of a pulse from the respective one of said output circuits but being opened in response to application of one of said change-of-state pulses only, means for normally developing a reject signal, means for eliminating the reject signal and for developing an accept signal in response to the conduction of a respective predetermined number of pulses through each of said test gates of said first channel only, and means for retaining a reject signal and preventing development of said accept signal in response to the conduction of a respective predetermined number of pulses through any of said test gates of said second channel.

4. A system for recognizing coded electrical signals comprising, a change-of-state detector, first and second counters, an interval generator, means for testing coincidence of the output of said change-of-state detector with the output of said interval generator, a signal input circuit connected to said detector, first and second gating means for said first and second counter respectively, an input for timing signal, means for applying a start-command signal to said first and second gating means, said first and second gating means responsive to the application of a start-command signal for applying the output of said detector to the input of said first counter and for applying simultaneously said timing signal to the input of said second counter, a storage register, transfer means connected between said second counter and said storage register, a comparator means connected between said storage register and said second counter, said first counter having an output circuit connected to control circuits of said transfer means, of said first and second gating means, and to a reset circuit of said second counter, said first counter in response to recording a predetermined number of pulses from said detector applying a resetting pulse to its output circuit, said first and second gating means responding to the application of said resetting pulse to interrupt simultaneously the application of signal from said detector to said first counter and the application of timing signal to said second counter, said transfer means responsive to the application of said resetting pulse for transferring to said storage register numerical information equal to a predetermined fraction of that number recorded on said second counter, said second counter being reset by the application of said resetting pulse, means for delaying said resetting pulse and for applying said delayed pulse to said second gating means, said second gating means responding to the application of said delayed pulse for reapplying said timing signal to said second counter, said comparator means developing a timing pulse for application to its output circuit in response to said second counter counting to a number equal to said stored fraction, said output circuit of said comparator being connected to said second counter, said second counter being reset in response to the application of said timing pulse, said second counter repeating its operation to provide a series of timing pulses separated by intervals equal to the frequency of said timing signal multiplied by said stored fraction, and said interval generator responsive to application of said timing pulses for generating successive similar series of pulses having corresponding pulses separated by different predetermined numbers of said intervals for application to said coincidence means to be compared with the output of said detector.

5. A code recognition circuit according to claim 4 having a synchronizing means connected between said change-of-state detector and the reset circuit of said second counter for synchronizing said timing pulses with said change-of-state pulses.

6. A code recognition system according to claim 5 in which said coincidence means has first and second channels, said first channel operating in response to coincidences of said change-of-state pulses with pulses of said series, said second channel operating in response to application of change-of-state pulses only during intervals between pulses of said series, and means for applying an accept signal in response to the operation of said first channel only in the absence of operation of said second channel.

References Cited in the file of this patent

UNITED STATES PATENTS

| | | |
|---|---|---|
| 2,512,038 | Potts | June 20, 1950 |
| 2,700,756 | Estrems | Jan. 25, 1955 |
| 2,854,653 | Lubkin | Sept. 30, 1958 |
| 2,969,912 | Reynolds | Jan. 31, 1961 |
| 2,973,507 | Grondin | Feb. 28, 1961 |
| 2,976,516 | Taber | Mar. 21, 1961 |